United States Patent [19]

Ward

[11] 4,042,055
[45] Aug. 16, 1977

[54] BATTERY POWERED VEHICLE AND DRIVE SYSTEM

[76] Inventor: Eugene T. Ward, 5791 Wilson Mills Road, Highland Heights, Ohio 44143

[21] Appl. No.: 642,135

[22] Filed: Dec. 18, 1975

[51] Int. Cl.$^2$ ............................................. B60L 11/18
[52] U.S. Cl. ....................................... 180/60; 180/27; 180/65 R; 180/68.5
[58] Field of Search ................ 180/65 R, 60, 27, 34, 180/59, 58, 56, 55, 54 F, 11, 12, 1 R, 68.5; 280/DIG. 5

[56] References Cited

U.S. PATENT DOCUMENTS

| | | | |
|---|---|---|---|
| 724,021 | 3/1903 | Lemp | 180/65 R X |
| 2,919,139 | 12/1959 | Rupp | 280/106 R |
| 3,190,387 | 6/1965 | Dow | 180/65 R |
| 3,533,484 | 10/1970 | Wood, Jr. | 180/65 R |
| 3,575,250 | 4/1971 | Dykes | 180/65 R X |
| 3,708,028 | 1/1973 | Hafer | 180/68.5 R |

*Primary Examiner*—Joseph F. Peters, Jr.
*Assistant Examiner*—Milton L. Smith
*Attorney, Agent, or Firm*—McNenny, Pearne, Gordon, Gail, Dickinson & Schiller

[57] ABSTRACT

An electrically driven vehicle, such as a local transportation vehicle, suburban runabout, light service vehicle or golf car, has a non-articulated frame with drive wheels associated with one end and a steerable wheel or wheels with the other end. Each of the drive wheels has its own permanent magnet direct current motor drive. The motors pass through a series-connected stage with unlimited differential action to a parallel-connected stage with limited differential action as the vehicle is brought up to speed from a stationary position. No mechanical differential is necessary and the vehicle may have a very low center of gravity and excellent center ground clearance. The drive system provides dynamic braking and energy restoration, with attendant control and energy saving advantages. This contributes to good traction and steerability under the varying operating conditions encountered. The weight of the batteries for the vehicle is sprung by the rear axle, so that the frame is relieved of carrying bending loads associated with the considerable proportion of total weight represented by the batteries. A vehicle embodying the invention can comfortably carry two 180-pound riders and two 20 or 30-pound golf bags more than 40 holes on a moderately hilly golf course using four standard 62½ pound 6-volt rechargeable batteries, and this use can be repeated indefinitely, using two or more interchangeable battery packs. The vehicle can perform as well with four batteries as other currently manufactured vehicles do with six.

4 Claims, 8 Drawing Figures

BATTERY POWERED VEHICLE AND DRIVE SYSTEM

FIELD OF THE INVENTION

The invention relates to electrically driven vehicles such as local transportation vehicles, suburban runabouts, light service vehicles, golf cars, and the like.

DESCRIPTION OF THE PRIOR ART

Examples of prior art vehicles are found in several U.S. patents. In Dykes U.S. Pat. No. 3,575,250 a two-wheeled vehicle with a quick-disconnect battery hung between the two wheels is connected to a variety of wheeled devices, such as a supermarket cart, to provide an articulated assembly driven by the two-wheeled vehicle. Each wheel of the two-wheeled vehicle has its own motor. The motors are series-connected at one setting and parallel-connected at another, and "in turning, one of the motors will load and slow down and the other will speed up in a differential action to assist in the turning of the vehicle."

In Dow U.S. Pat. No. 3,190,387 a four-wheeled vehicle has two drive wheels each provided with its own motor carried on the vehicle frame which is sprung on the wheels. The batteries are carried over the rear axle of the vehicle but forwardly of the motors and on the sprung frame.

In Rupp U.S. Pat. No. 2,919,139 a stationary rear axle is fixed to tubular side frame members. A pair of gasoline engines each drives one of the rear wheels through its own drive linkage.

In Hafer U.S. Pat. No. 3,708,028 an electric truck is provided with a battery pack that can be positioned and removed from the side of the truck with a fork lift truck.

BACKGROUND OF THE INVENTION

Electrically propelled light service vehicles offer obvious advantages over gasoline powered cars from the standpoint of noise and pollution. Nevertheless, they have had limited success in competing with gasoline vehicles because of distance and performance limitations associated with reasonable restriction of the number of batteries required to be used at a time, reasonable service life for the batteries, and cost and inconvenience of recharging and keeping track of which vehicles are charged, and to what degree, during periods of heavy demand for use.

The present invention provides a light service vehicle that is superior in these respects. For example, when used as a golf car, the vehicle can carry a payload of two passengers and golf bags for well over 36 holes on a golf course using four batteries of standard electric vehicle type. With two batteries the loaded vehicle will go well over 18 holes.

The vehicle of the invention is provided with a quick-change battery pack loadable and unloadable over the rear of the vehicle by a light manually operated dolly. By providing an excess of battery packs for a fleet of vehicles, recharging can proceed independently of use of the vehicles.

When the vehicle is used as a golf car with a two-battery pack, the vehicle will complete 18 holes with a comfortable margin of reserve. At the end of every 18 holes a fresh battery pack can be installed in a matter of seconds for the next 18 holes of operation. With a four-battery pack, the vehicle will complete 36 holes with a comfortable margin of reserve. A fresh pack can then be installed if further service is required that same day. Or, four-battery packs can be interchanged every 18 holes to further extend battery life and reduce recharge time.

In the vehicle of the invention, the axle associated with the drive wheels may be non-rotating and fixed near each end to a tubular side frame member. The axle may bend and the frame members twist under the loading imposed by the weight of the vehicle frame, batteries and payload. This relatively stiff springing is supplemented by softer springing of the passenger seats and luggage carrying racks with respect to the vehicle frame. This stiff springing arrangement with respect to the vehicle frame and batteries but not the passengers and payload allows a substantial saving in the overall weight of the vehicle without sacrifice of reasonable passenger comfort. This contributes to achievement of good accelleration and braking and good operating economy for the vehicle whether used as an on-the-road vehicle such as a suburban runabout or an off-the-road vehicle such as a golf car. When the vehicle is used as a golf car, the light weight also reduces the potential for damage to the golf course when the ground is soft and allows quicker resumption of vehicle use following adverse climatic or seasonal conditions.

Also contributing to the operating economy of the vehicle is the power system of the vehicle. This power system also contributes importantly to good traction and steerability of the relatively light vehicle under all operating conditions. For on-the-road applications, the power system allows good control of accelleration and decelleration in street traffic under all conditions, including ice and snow. These contributions will be more fully described in the description of the illustrated embodiment of the invention set forth below.

DESCRIPTION OF THE ILLUSTRATED EMBODIMENT

Figure 1:
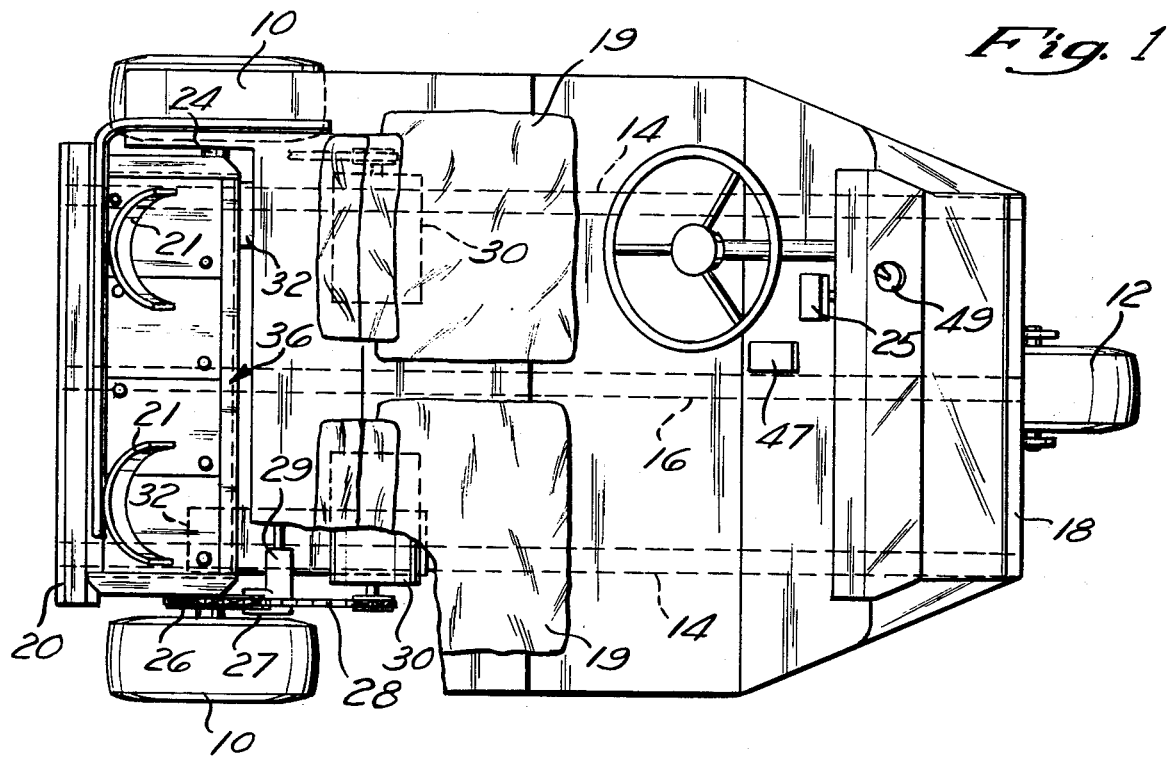
FIG. 1 of the accompanying drawings is a top plan view, partly broken away, of a vehicle embodying the invention.

Although the invention may be employed with four-wheel vehicles, or vehicles with a front wheel drive, it is illustrated as embodied in a three-wheeled rear-wheel drive vehicle, the presently preferred embodiment. Although the invention may be employed for suburban runabouts and other on-the-road vehicles, it is shown as embodied in a golf car for purposes of illustration.

In the illustrated vehicle, drive wheels 10 support the rear of the vehicle and a steerable wheel 12 supports the front of the vehicle. The wheels 10 and 12 are mounted together on a non-articulated unitary vehicle chassis which in the illustrated example includes tubular side frame-members 14 and a central frame member 16 and transverse front and rear frame members 18 and 20. The rear frame member 20 may also function as a rear bumper and as a battery pack retainer as illustrated in FIG. 2 and discussed later in this description.

Figure 3:
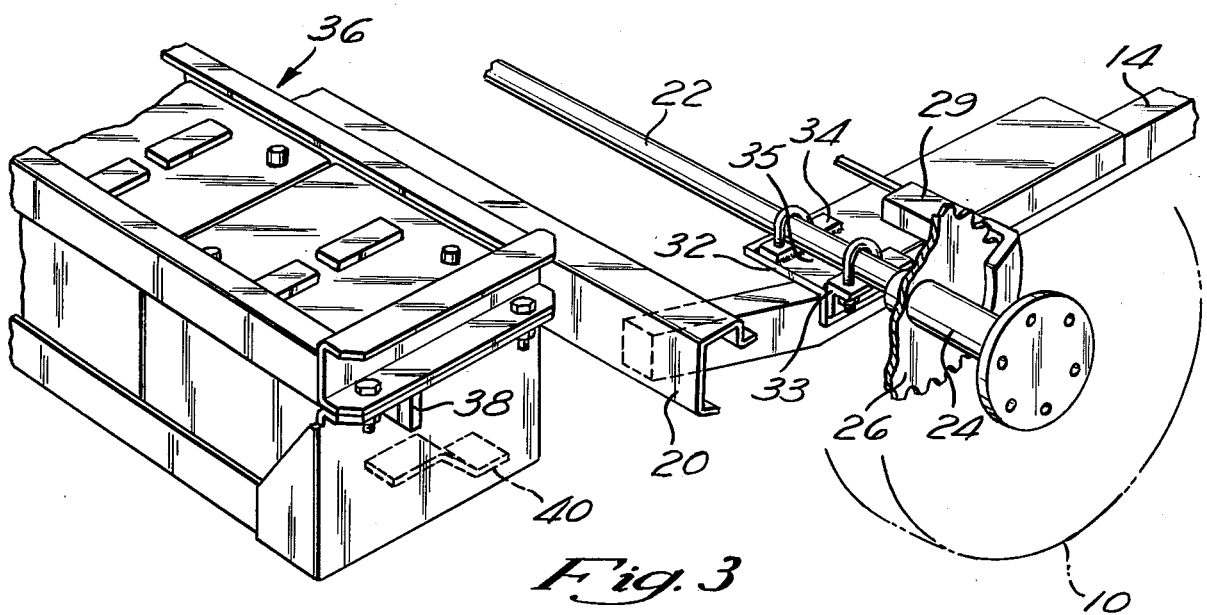
FIG. 3 is a isometric view of the right rear portion of the vehicle illustrated in the earlier figures, and a portion of an associated battery pack which has been removed therefrom.

The vehicle is provided with a non-rotating springing rear axle 22. Each drive wheel 10 is mounted on its own end of the axle 22 by means of a rotatable mounting such as the bearing sleeve 24 seen in FIG. 3 to which a sprocket 26 is keyed. A chain drive 28 (FIG. 1) is associated with each drive wheel 10 and drives the associated sprocket on the drive wheel mounting. Each chain drive 28 is powered by a permanent magnet direct current motor 30. The non-rotating axle 22 is fixed to the tubular side frame members 14 in the manner best illustrated in FIG. 3. In the particular arrangement shown, a plate or angle 32 is welded to each side frame member 14. The non-rotating rear axle is fixed by U-bolts to each plate or angle 32 and to an associated small angle 33 welded thereto. Upon springing flexure of the axle, each side member is also springingly biased, but in torsion rather than in bending. Each motor 30 is mounted on one of the plates 32, and due to the twisting of the associated side frame member 14, the motor shaft tends to remain parallel to the end of the axle 22 at all times. This maintains driving engagement of the chain drive 28 with the sprocket 26 during flexure of the rear axle. The springing twisting of the side frame members 14 supplements the springing flexure of the rear axle 22 in providing a stiff primary springing of the chassis.

A caliper type brake 27 (FIGS. 1 and 3) is associated with each sprocket 26 and closes when a brake pedal 25 is depressed. The brake actuator 29 and brake may be supported on plate or angle 32 for movement therewith as the axle 22 springs and flexes.

Figure 2:
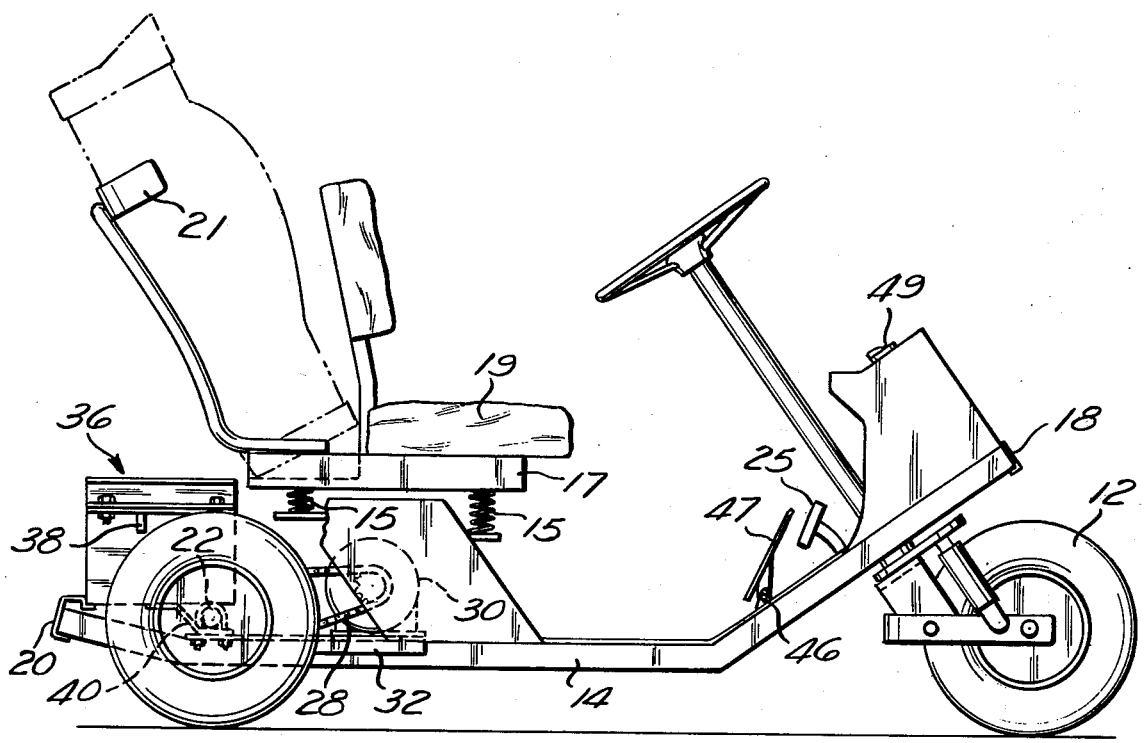
FIG. 2 is a side view of the vehicle seen in FIG. 1, also partly broken away.
Figure 5:
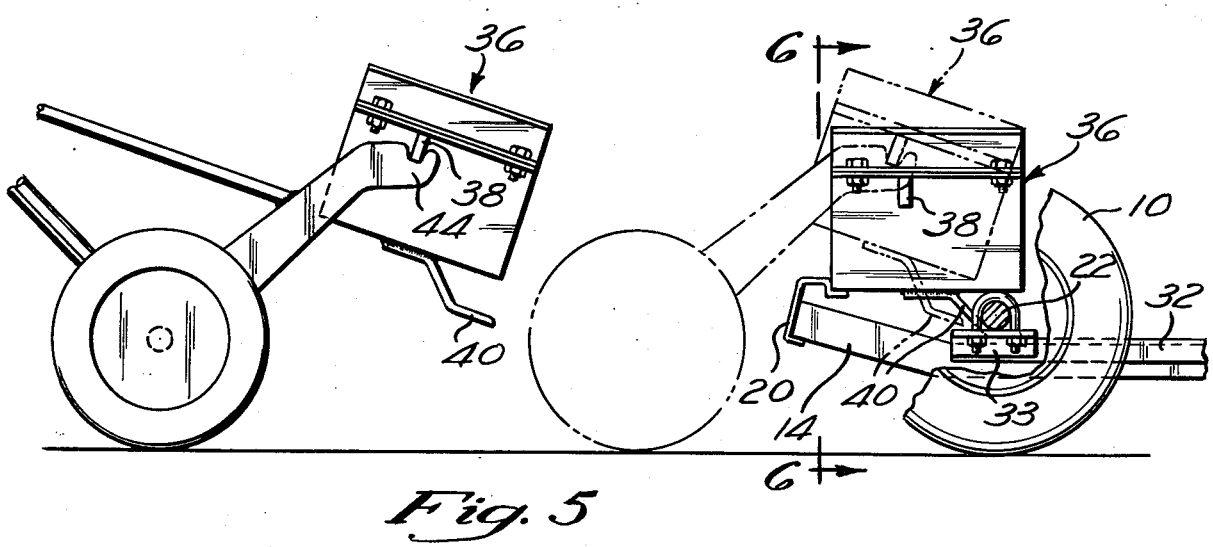
FIG. 5 is a schematic illustration of the loading and unloading of a battery pack by use of the dolly.
Figure 6:
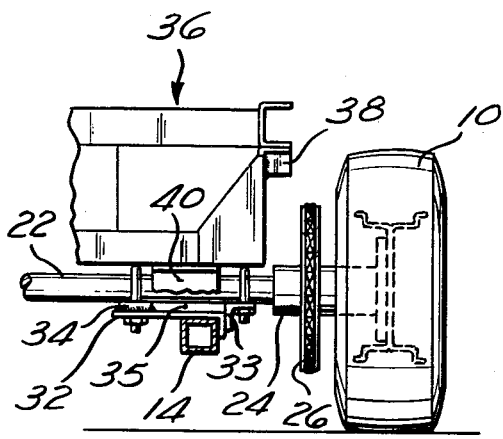
FIG. 6 is a view, partly broken away, taken on the plane of line 6—6 in FIG. 5.

A battery pack 36 is supported without intervening springs directly over the axle 22, as best illustrated in FIGS. 2 and 5. In the illustrated vehicle, the battery pack 36 comprises four automotive type 6-volt batteries held in an open frame, the top portion of which is releasably secured to the bottom portion by bolts in a manner which will be apparent from the drawings. Each end of the battery pack is provided with a lifting flange or lug 38, and the underside of each end of the battery pack is provided with an axle-engaging finger 40. Clearance for receiving the axle-engaging finger 40 is provided above the plate 32 by a spacer member 34 and by the difference in level between the top surface of the plate 32 and the small angle 33, as most clearly seen in FIGS. 3 and 6. An open space 35 is thereby defined immediately below the axle 22 which is of adequate dimensions to receive the axle-engaging finger 40.

Figure 4:
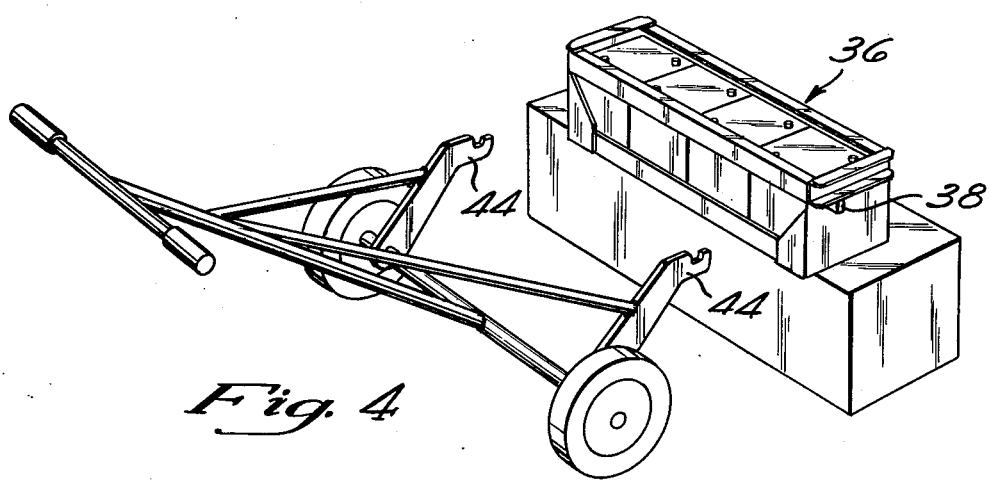
FIG. 4 is a isometric view of a dolly used to load and unload battery packs, and a battery pack to be loaded thereby.

A manually manipulatable dolly, such as that shown in FIG. 4, is provided with a pair of lug supports 44 each adapted to engage one of the lifting flanges or lugs 38 to suspend the battery pack 36 from the dolly. The dolly is used to slip the battery pack into position on the vehicle, or remove it from the vehicle in the manner illustrated in FIG. 5. The engagement between the lug supports 44 and the lugs 38 allows pivoting of the battery pack with respect to the dolly, so that as the forward side of the battery pack begins to rest on the rear axle and the axle-engaging fingers 40 begin to slip into the spaces 35, the rearward side of the battery pack is free to pivot downwardly from the phantom position of the solid line position shown in the righthand portion of FIG. 5. This motion is reversed upon removal of the battery pack. When the battery pack comes to rest in supported position on the vehicle, the illustrated recess in the top of the rear frame-member 20 acts as a retainer, as best seen in FIG. 5. When the battery pack is removed by engaging the lug supports 44 with the lugs 38, the rear of the battery pack is initially raised sufficiently to clear the member 20 and allow rearward and upward movement of the battery pack to clear the fingers 40. The endmost terminals in the battery pack are connected, after installation of the pack, to power cables associated with the vehicle by conventional or quick-disconnect connectors (not shown), and are disconnected from the power cables before removal of the battery pack.

During charging, the batteries may be supported on suitable shelves or pedestals, such as the one shown in FIG. 4, on which the battery pack 36 is supported. Cut outs or notches (not shown) on the support for the battery pack should be provided to accommodate the axle-engaging fingers 40 (not seen in FIG. 4).

The vehicle chassis and batteries (each of the batteries may weigh approximately 62.5 pounds) are stiffly sprung by the axle 22 and side frame members 14, with a minor portion of the weight also being carried on the front suspension system which may be any conventional system. Softer springing for the payload — riders and bags or other luggage or payload — is provided by springs 15 which are supported on chassis-connected tabs or brackets as shown in FIG. 2 and which in turn support a floating frame 17 on which the seats 19 and bag brackets 21 are fixed, as shown.

Figure 7:
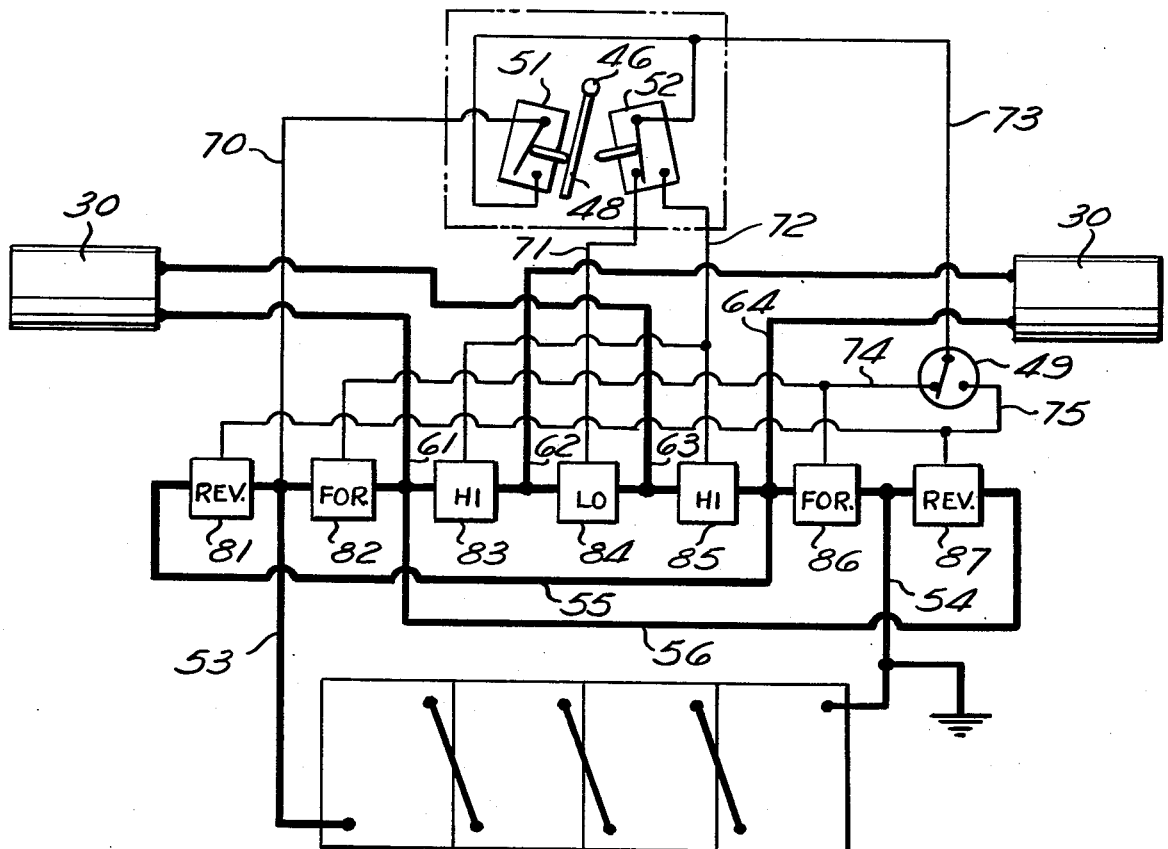
FIG. 7 is a schematic drawing of the power and control system of the vehicle.

The control system for the motors 30 is shown in FIG. 7. Power leads are shown in dark line and control leads in light line. The shaft 46 (seen in FIG. 7 from the opposite end that is seen in FIG. 2) of a spring loaded control pedal 47 (seen only in FIGS. 1 and 2) is fixed to a switch actuator arm 48 associated with a pair of microswitches 51 and 52 each of which is spring biased to the position in which its illustrated actuator rod or button projects the maximum amount. The microswitch 51 is a single throw switch which is normally open. The arrangement is such that as the pedal 47 is depressed the arm 48 moves to the right as seen in FIG. 7 allowing the switch 51 to close, and as the pedal continues to be depressed, the arm 48 actuates the double throw switch 52 to change the throw of the switch 52 from that illustrated to the alternative. As the pedal 47 is released, the reverse sequence occurs.

With switch 51 open, none of the solenoids 81-87 is activated. As the arm 48 moves to the right to allow switch 51 to close, solenoid 84 is energized through control lead 71 to connect power leads 62 and 63 in series. The forward-reverse switch 49 is also energized through control lead 73. In the illustrated position this forward-reverse switch energizes solenoids 82 and 86 through control lead 74 to connect power leads 61 and 64 with battery terminal power leads 53 and 54 respectively. The motors are thereby connected in series for driving in the forward direction. (If the switch 49 is in the other throw position, solenoids 81 and 87 will be energized rather than solenoids 82 and 86. In this condition, power leads 61 and 64 are connected with battery terminal leads 54 and 53 respectively, via crossover power leads 56 and 55, and the motors, still in series, drive in the reverse direction.)

As the arm 48 moves further to the left and microswitch 52 is thrown to open lead 71 and contact lead 72, solenoid 84 is de-energized and solenoids 83 and 85 are energized to establish parallel connection of power leads 61 and 62 on the one hand and 63 and 64 on the other. The motors are thereby connected in parallel. With switch 49 in the illustrated forward position, power leads 61 and 62 are connected to battery terminal power lead 53 and power leads 63 and 64 are connected to battery terminal power lead 54 to thereby power the parallel connected motors 30 in the forward direction. (If the switch 49 is in the other throw position, power leads 61 and 62 are connected to battery terminal power lead 54 through crossover power lead 56, and power leads 63 and 64 are connected to battery terminal power lead 53 through crossover power lead 55, and the motors, still in parallel, drive in the reverse direction.)

Thus, when the control pedal 47 is slightly depressed, the motors 30 are connected in series and when the control pedal is further depressed to its limit they are connected in parallel. For a golf car application, the motors may have a rating of say 1500 r.p.m. at 24 volts and 750 r.p.m. at 12 volts. With a 24-volt power supply, when the motors are connected in parallel, they are both trying independently to rotate at 1500 r.p.m. Thus, if one wheel loses traction completely, the other wheel will continue to experience substantially the same motor force, thus providing the effect of a limited slip differential. The motors in parallel will tolerate a limited differential in speed of about ±10% so that when the vehicle is at speed (say 10 or 11 miles per hour in a golf car application) the allowable speed differential will permit each wheel to accommodate itself to any turning radius that might be encountered at that speed.

Assuming the same motor rating, when the pedal is only partially depressed, the motors will be trying to operate at only 750 r.p.m., and the vehicle will be traveling at a relatively low speed. The series connected motors will automatically distribute power so as to allow the widest speed differential down to the point where one of the wheels can be easily fully stopped so long as the other is free to rotate. Thus, at low speed, the sharpest radius turns can be accommodated.

I have discovered that the provision of such a drive on a vehicle with a unitary non-articulated chassis which mounts both the power wheels and the steerable wheel means, and with the majority of weight being on the drive wheels, but a substantial portion of the weight being on the steerable wheel means, provides a vehicle that is easily steerable and controllable under substantially all conditions encountered in on-the-road driving or on a golf course, and a vehicle that is also amenable to the substantial operating economies and advantages mentioned at the beginning of this specification. Additionally, when operating downhill on hilly terrain, the motors 30 will act as regenerators at speeds in excess of rated speed, thereby contributing to operating economy. The fact that the vehicle is not free wheeling under these conditions also contributes to good control.

In an on-the-road vehicle, the drive will be geared to provide less reduction from the motor to the wheels so as to increase the vehicle speed that corresponds to rated motor speed. With the pedal fully depressed and the motors running in parallel, the above-described effect of a limited slip differential gives excellent accelleration or retarding action under snow and ice conditions, while the limited speed differential tolerance of say ±10% permits the vehicle to accommodate itself to a reasonable turning radius without slippage under dry road conditions. Again, when the control pedal is partly depressed so that the motors are in series and lower speed is called for, the power distribution between the motors will accommodate turns of the sharpest radius without slippage under dry road conditions.

Figure 8:
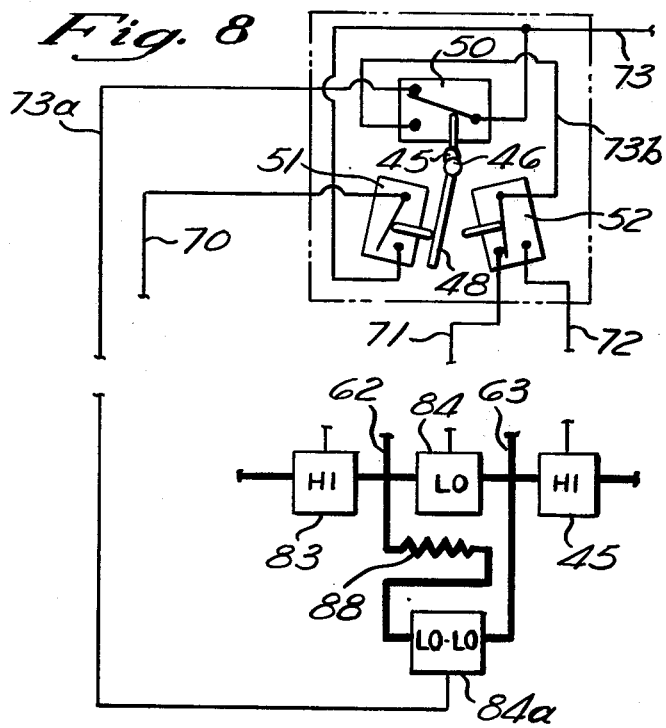
FIG. 8 is a drawing similar to a portion of FIG. 7 and showing a modification of the power and control system.

In the modification shown in FIG. 8, the overall system is the same as that shown in FIG. 7 except for the changes illustrated in FIG. 8. A third microswitch 50 is provided, spring-biased like the others to the position in which its illustrated actuator rod or button projects the maximum amount. A small cam may be provided on the shaft 46 to engage the actuator button of switch 50. The arrangement is such that as pedal 47 is depressed and arm 48 moves to the right, switch 51 first closes, then after slight additional movement of arm 48, the surface of cam 45 drops away from the actuator button of switch 50 to the point where sitch 50 reverses to connect lead 73 to lead 73b instead of to lead 73a to which it is initially connected. Additional movement of arm 48 changes the throw of switch 52 from that illustrated. As the pedal 47 is released, reverse sequence occurs.

The result is that as the pedal is depressed, solenoid 84a first closes, then solenoid 84a opens and solenoid 84 closes, then solenoid 84 opens and solenoids 83 and 85 close. The closing of solenoid 84a corresponds to an additional "low-low" stage in which the presence of the resistor 88 in the circuit reduces the voltage drop across the motors 30, and therefore reduces their rated speed, to thereby provide for a more gentle start-up and for running at very low speed on a continuous basis when desired, such as in a driveway or loading area or around the clubhouse area of a golf club.

The weight of the vehicle unloaded and without batteries may be about 300 pounds. With a battery pack and four batteries the weight may become about 550 pounds, of which about 70 pounds is on the front wheel. With a single 180 pound driver and 20 pounds of luggage, the total weight becomes about 750 pounds of which about 140 pounds is on the front wheel. With a driver and passenger each weighing 180 pounds and 40 pounds of luggage, the total weight reaches about 950 pounds of which about 210 pounds is on the front wheel.

The scope of the invention is not necessarily limited to the specific details of the illustrated embodiment, but is defined by the following claims.

What is claimed is:

1. In an electrically driven vehicle, driving wheel means carrying one end of the vehicle, steerable wheel means carrying the other end of the vehicle, the driving wheel means and the steerable wheel means being mounted together on a non-articulated unitary vehicle chassis, whereby the driving wheel means and the steerable wheel means share the weight of the vehicle without intervening chassis articulation between the driving wheel means and the steerable wheel means, the majority of the weight being on the driving wheel means but a substantial portion of the weight being on the steerable wheel means, the driving wheel means comprising a pair of drive wheels each with its own direct current motor drive, a non-rotating springing rear axle, each drive wheel being rotatably mounted at its own end of the axle, the motor drive for each wheel being mounted to maintain driving engagement with the rotatable mounting of the wheel during springing of the axle, switch means for alternatively connecting the motor drives to a power source in series or in parallel to provide respectively conditions of unlimited rotational slip and limited rotational slip between the drive wheels during power application.

2. In an electrically driven vehicle, driving wheel means carrying one end of the vehicle, steerable wheel means carrying the other end of the vehicle, the driving wheel means and the steerable wheel means being mounted together on a non-articulated unitary vehicle chassis, whereby the driving wheel means and the steerable wheel means share the weight of the vehicle without intervening chassis articulation between the driving wheel means and the steerable wheel means, the majority of the weight being on the driving wheel means but a substantial portion of the weight being on the steerable wheel means, the driving wheel means comprising a pair of drive wheels each with its own direct current motor drive, a non-rotating springing rear axle, each drive wheel being rotatably mounted at its own end of the axle, the motor drive for each wheel being mounted to maintain driving engagement with the rotatable mounting of the wheel during springing of the axle, switch means for alternatively connecting the motor drives to a power source in series or in parallel to provide respectively conditions of unlimited rotational slip and limited rotational slip between the drive wheels during power application, the power source comprising batteries, the majority of the weight of the batteries being sprung by the axle and contributing to high traction under the limited slip condition, and the steerable wheel means carrying a sufficient portion of the weight of the vehicle for steerability under the limited slip condition as well as under the unlimited slip condition.

3. In an electrically driven vehicle, driving wheel means carrying one end of the vehicle, steerable wheel means carrying the other end of the vehicle, the driving wheel means and the steerable wheel means being mounted together on a non-articulated unitary vehicle chassis, whereby the driving wheel means and the steerable wheel means share the weight of the vehicle without intervening chassis articulation between the driving wheel means and the steerable wheel means, the majority of the weight being on the driving wheel means but a substantial portion of the weight being on the steerable wheel means, the driving wheel means comprising a pair of drive wheels each with its own direct current motor drive, a non-rotating springing rear axle, each drive wheel being rotatably mounted at its own end of the axle, two longitudinally extending chassis frame members fixed to the axle adjacent each end thereof to springingly twist upon springing flexure of the axle, the motor drive for each wheel being mounted to maintain driving engagement with the rotatable mounting of the wheel during said flexure, switch means for alternatively connecting the motor drives to a power source in series or in parallel to provide respectively conditions of unlimited rotational slip and limited rotational slip between the drive wheels during power application.

4. In an electrically driven vehicle, driving wheel means carrying one end of the vehicle, steerable wheel means carrying the other end of the vehicle, the driving wheel means and the steerable wheel means being mounted together on a non-articulated unitary vehicle chassis, whereby the driving wheel means and the steerable wheel means share the weight of the vehicle without intervening chassis articulation between the driving wheel means and the steerable wheel means, the majority of the weight being on the driving wheel means but a substantial portion of the weight being on the steerable wheel means, the driving wheel means comprising a pair of drive wheels each with its own direct current motor drive, a non-rotating springing rear axle, each drive wheel being rotatably mounted at its own end of the axle, two longitudinally extending chassis frame members fixed to the axle adjacent each end thereof to springingly twist upon springing flexure of the axle, the motor drive for each wheel being mounted to maintain driving engagement with the rotatable mounting of the wheel during said flexure, switch means for alternatively connecting the motor drives to a power source in series or in parallel to provide respectively conditions of unlimited rotational slip and limited rotational slip between the drive wheels during power application, the power source comprising batteries, the majority of the weight of the batteries being sprung by the axle and contributing to high traction under the limited slip condition, and the steerable wheel means carrying a sufficient portion of the weight of the vehicle for steerability under the limited slip condition as well as under the unlimited slip condition.

* * * * *